United States Patent [19]
Kim et al.

[11] Patent Number: 5,346,141
[45] Date of Patent: Sep. 13, 1994

[54] METHOD FOR PULVERIZING SILICON PARTICLES BY FLUID JET ENERGY

[75] Inventors: Hee Y. Kim; Dae H. Kwon; Yong M. Song; Sung W. Kim; Jong Y. Jeon; Kang M. Lee; Jae S. Lee, all of Daejon, Rep. of Korea

[73] Assignee: Korea Research Institute of Chemical Technology, Daejon, Rep. of Korea

[21] Appl. No.: 1,094

[22] Filed: Jan. 6, 1993

[30] Foreign Application Priority Data

Mar. 19, 1992 [KR] Rep. of Korea ............... 4529/1992

[51] Int. Cl.$^5$ .................. B02C 19/06; B02C 19/12; B02C 23/00
[52] U.S. Cl. ............................... 241/5; 241/8; 241/39
[58] Field of Search ............... 241/5, 18, 19, 24, 39, 241/40, 8, 9, 10; 209/138, 139.1, 140, 141

[56] References Cited

U.S. PATENT DOCUMENTS

| | | |
|---|---|---|
| 4,538,764 | 9/1985 | Dunbar .................. 241/39 |
| 4,553,704 | 11/1985 | Wilson et al. .......... 241/39 |
| 4,579,288 | 4/1986 | McDermid et al. ...... 241/39 |
| 4,691,866 | 9/1987 | Belk ...................... 241/40 |
| 4,857,173 | 8/1989 | Belk ...................... 209/141 |
| 4,905,918 | 3/1990 | Seles et al. ............ 241/39 |

*Primary Examiner*—Timothy V. Eley
*Attorney, Agent, or Firm*—Browning, Bushman, Anderson & Brookhart

[57] ABSTRACT

A jet pulverizing method is described for preparing silicon seed particles from silicon feed particles without contamination. The method comprises accelerating silicon feed particles by fluid jet energy and colliding them with each other within a pulverizing chamber to fracture or split them into small particles which are recovered for use as seed particles. The method is characterized by the technique that silicon particles fluidized within the pulverizing chamber are formed into a dilute-phase fluidized bed with low particle density. Thus, the generation of fine powders may be suppressed and additional sieving to separate larger particles is not required.

20 Claims, 2 Drawing Sheets

METHOD FOR PULVERIZING SILICON PARTICLES BY FLUID JET ENERGY

BACKGROUND OF THE INVENTION

1. Field of the Invention

The present invention relates to the preparation of small silicon particles that are suitable for use as seed particles in a fluidized bed reactor for producing high-purity polycrystalline silicon (polysilicon"). More particularly, the present invention relates to a method for pulverizing silicon particles wherein silicon feed particles are introduced into a pulverizing chamber, collide with each other and pulverize by fluid jet energy to prepare small silicon seed particles without contamination.

2. Description of the Background

As a typical method of producing polysilicon, the Siemens process has widely been used wherein silicon is deposited on a heated silicon rod by the electrical resistance method in a bell jar. However, the productivity of silicon is low since the reaction area of the Siemens reactor is restricted to the surface of the silicon rod. In addition, the cooling necessary for avoiding silicon deposition on the surface of the bell jar lowers thermal efficiency. Therefore, the polysilicon produced by the Siemens process is expensive.

To overcome the foregoing disadvantages, many efforts have been made on a fluidized bed process which has a larger reaction area and a higher yield than the Siemens process and thereby can produce polysilicon with lower cost. Ethyl Corporation now produces semiconductor-grade polysilicon granules commercially by a fluidized bed process using monosilane as a source gas. According to the fluidized bed process, the seed silicon particles charged within a reactor are fluidized with hydrogen and the silicon source gas, e.g., monosilane, trichlorosilane, or the like. Silicon is deposited on the surface of said silicon particles to produce polysilicon by the thermal decomposition or hydrogen reduction of the silicon source gas.

To operate a fluidized bed reactor continuously, the quantity and size of silicon particles within the reactor must be maintained in a predetermined range. For this purpose, the grown silicon particles should be recovered from the bottom of the reactor as polysilicon products while small silicon seed particles should be charged into the reactor continuously.

As a conventional method for preparing the silicon seed particles for the fluidized bed process, a method is available which comprises crushing silicon lumps or particles by mechanical apparatus, sieving, repeated acid washing and rinsing, and drying. In this method the wet process of washing and rinsing is very important due to considerable contamination from abrasion of the apparatus. However, it is most difficult to obtain seed particles of the required purity by the wet process.

Improved methods for preparing silicon seed particles with less contamination have also been developed. Two of the methods are disclosed in laid open Japanese Patent Publication No. 58-145,611 and U.S. Pat. No. 4,691,860. According to the former publication, silicon nuggets or particles are pulverized between two rollers made of high purity silicon bar, and then the pulverized particles are sieved to have a predetermined size range, thereby preparing small silicon seed particles of high purity. However, this method has several disadvantages. For example, the silicon bars are greatly abraded, many particles are produced outside of the desired size range, and the sieving system is comparatively complicated. The method disclosed in the latter publication comprises transporting the silicon particles in a gas flow to accelerate and split them by collision with a silicon plate. This method also can produce high-purity silicon seed particles, but it is necessary to replace the silicon colliding plate with a new one periodically due to serious abrasion. In addition, the yield of the seed particles of the desired size range is low since silicon particles are pulverized by single collision with the plate.

Other than the aforementioned methods, a fluidized-bed jet pulverizing method has conventionally been used to pulverize solid particles finely wherein they collide with each other by fluid jet energy within a fluidized bed. This method pulverizes particles by filling a pulverizing chamber with solid particles to a certain level for the purpose of increasing collisions between the particles. In experiments by the present inventors to pulverize silicon particles of about 300–3,000 microns by this method, it was found that the pulverizing efficiency was low and that an excessive quantity of fine powders that are unsuitable for use as seed particles were generated. The low efficiency is probably the result of the phenomenon that the formation of a jet stream is interrupted by the high volumetric density of silicon particles circulating around the jet nozzle. This result may also be explained by the theory that the pulverizing efficiency suddenly drops when the volumetric density of solid particles in the pulverizing zone becomes greater than about 0.1. See the article by Tanaka at pages 213–215 of Ind. Eng. Chem. Process Des. Develop., Vol. 12, No. 2 (1973). The generation of excessive fine powders is a natural outcome since this method has been used for the purpose of preparing fines below several tens of microns.

For these and other reasons, it is apparent that conventional pulverizing methods are not efficient and economical for preparing the small silicon particles with high purity which are suitable for use as seeds in a fluidized bed reactor to prepare high purity polysilicon. Therefore, it is an object of the present invention to provide an improved jet pulverizing method for preparing silicon seed particles without contamination by colliding silicon particles with each other. It is a further object of the present invention to provide an improved jet pulverizing method that can suppress the generation of fine powders that are unsuitable for use as seed particles. It is a further object of the present invention to provide an improved jet pulverizing method by which silicon feed particles may be fed into a pulverizing chamber automatically without an additional feeding apparatus. It is an additional object of the present invention to provide an improved jet pulverizing method which can recover pulverized particles without additional sieving to separate and remove particles larger than the desired size.

SUMMARY OF THE INVENTION

The present invention is directed to the preparation of small silicon particles which are suitable for use as seed particles in a fluidized-bed chemical vapor deposition process. According to the present invention, high purity silicon seed particles are prepared by a jet pulverizing method wherein silicon particles are accelerated by a fluid jet stream and collided with each other within a pulverizing chamber to cause fracturing or splitting into smaller particles which are recovered for use as seeds. Also according to the invention, silicon seed particles are prepared by a new jet pulverizing method wherein silicon particles fluidized within a pulverizing chamber are formed into a dilute-phase fluidized bed with low particle density. Thus, the generation of fine powders is suppressed and additional sieving to separate and remove particles larger than the desired size is not required. There is further provided a pulverizing process for introducing silicon feed particles into a pulverizing chamber automatically without contamination.

BRIEF DESCRIPTION OF THE DRAWINGS

The present invention is hereinafter further described with reference to the accompanying drawings in which.

DETAILED DESCRIPTION OF THE INVENTION

Figure 1:
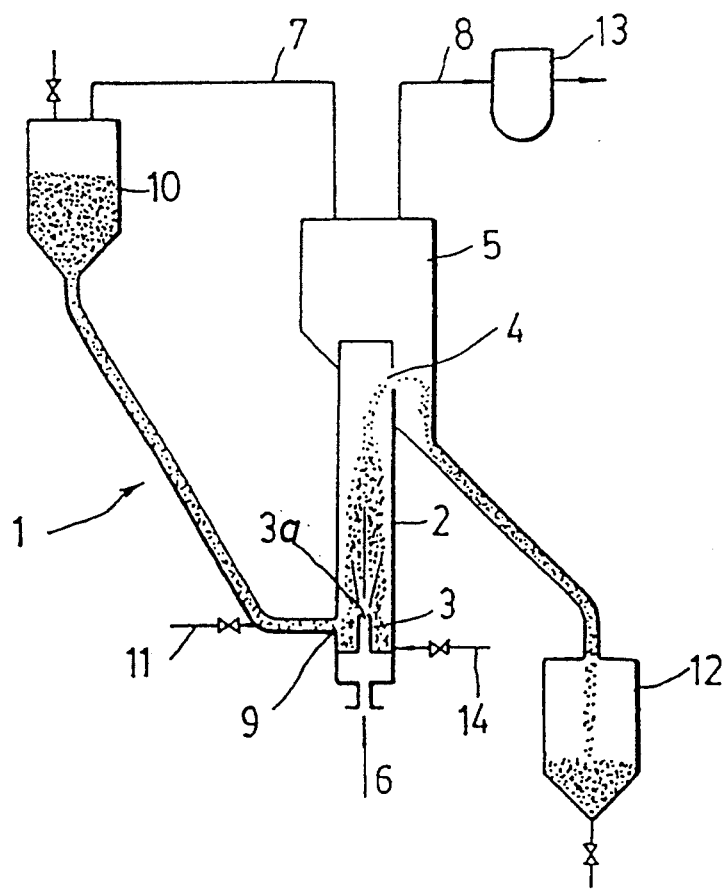
FIG. 1 illustrates one embodiment of the jet pulverizing apparatus which is used in a united body with a separation chamber according to the present invention.

A preferred embodiment of the present invention is a jet pulverizing apparatus for producing silicon seed particles from silicon feed particles larger than the seed particles. The apparatus comprises a cylindrical pulverizing chamber, a jet nozzle positioned within the lower center portion of the pulverizing chamber, a vent hole positioned at the upper wall of the pulverizing chamber and much narrower than the pulverizing chamber, and an inlet hole for feed particles positioned at the wall of the pulverizing chamber and at a level similar to that of the jet nozzle.

According to the present invention, in producing silicon seed particles by pulverizing silicon particles, silicon feed particles having an average diameter in the range of about 300–3,000 microns are introduced into a pulverizing chamber through an inlet hole. A gas stream is flowed through a jet nozzle positioned within the lower center portion of the pulverizing chamber with a jet velocity of about 300–10,000 m/sec at the jet nozzle outlet so that silicon particles near the jet nozzle accelerate and collide with each other. These high velocity collisions pulverize the silicon particles so that the bed of silicon particles fluidizes in the pulverizing chamber and forms into a dilute-phase fluidized bed without an upper boundary.

Here the term "dilute-phase fluidized bed" which is well known to anyone in the art, means a certain state of fluidized bed where the average gas velocity in the pulverizing chamber is high enough as that the fluidized bed has no upper boundary and particles below a predetermined size are floated by the gas stream to be vented out of the pulverizing chamber. See the explanation at pages 2–3 of *Fluidization Engineering*, by Kunii and Levenspiel (1969). In addition to this meaning, dilute-phase fluidized bed will be understood herein to mean a state where the particle density, defined as the ratio of the volume of solid particles to the volume of the pulverizing chamber between the jet nozzle outlet and the vent hole is maintained below about 0.2, preferably in a range of about 0.01–0.1.

According to experiments by the present inventors, only when pulverized and formed into the above-mentioned dilute-phase fluidized bed, were silicon particles of about 300–3,000 microns average particle diameter pulverized efficiently with simultaneous reduction of production of fine powders below about 100 microns which are not suitable for use as seeds. When a dense phase fluidized bed was formed by increasing the particle density in the pulverizing chamber, the pulverizing efficiency dropped rapidly. When the jet velocity was increased for the purpose of improving the pulverizing efficiency, a slugging motion was generated finally resulting in choking wherein silicon particles not pulverized were vented out of the pulverizing chamber intermittently in large quantities.

In the present invention, to form the desired dilute-phase fluidized bed, the following three conditions must be maintained:

(1) The average gas velocity in the upper section of the pulverizing chamber, i.e., the volumetric gas flow rate divided by the cross-sectional area of the upper section, must be maintained in a range of about 0.5–30 m/sec so that pulverized small silicon particles below a predetermined size are floated by a gas stream and vented out of the pulverizing chamber through a vent hole positioned at the upper wall of the pulverizing chamber.

(2) The particle density between the jet nozzle outlet and the vent hole must be maintained below about 0.2.

(3) The cross-sectional area of the vent hole must be smaller than that of the pulverizing chamber.

As a gas for the jet stream, any gas which does not contaminate silicon particles and has high purity may be used. Exemplary gases include purified air, nitrogen, hydrogen, argon, helium, and the like.

The nozzle pressure or the jet velocity at the nozzle outlet is preferably high enough that all silicon feed particles are pulverized. In the present invention, the jet velocity at the jet nozzle outlet, which is difficult to prescribe or measure accurately, is defined as the value of the gas flow rate for the jet stream divided by the cross-sectional area of the jet nozzle. According to high velocity gas dynamics, the gas flow rate ( or the jet velocity defined as above) is approximately proportional to the nozzle pressure when the nozzle pressure is larger than a critical value. As the average size of the silicon feed particles increases and the molecular weight of the gas used for the jet stream decreases, a higher jet velocity is required for efficient pulverization.

According to experiments by the present inventors, when pulverizing efficiently silicon particles with a diameter of about 700 microns and about 2,000 microns, respectively, in a jet pulverizing apparatus of the present invention with a single jet nozzle of 1.75 mm diameter, nozzle pressures of 5 bars (or jet velocity of 1,090 m/sec at the jet nozzle outlet) and 8 bars (or jet velocity of 1,640 m/sec), respectively, were required. On the other hand, according to other experiments using different gases, the jet velocity at the nozzle outlet which is required for efficient pulverization was approximately in inverse proportion to the square root of the gas density. The jet velocity for hydrogen gas was required to be about 3.6 times faster than that for nitrogen gas.

When pulverizing silicon feed particles having an average diameter in the range of about 300–3,000 microns, the jet velocity at the nozzle outlet is required to be in a range of about 300–10,000 m/sec, preferably about 1,000–5,000 m/sec, without regard to the gas species used for the jet stream. A jet velocity over about 10,000 m/sec is not economical because it requires the gas to be too highly pressurized (over 13 bars in the case of hydrogen gas). A jet velocity below about 300 m/sec does not produce efficient pulverization.

The jet nozzle of the present invention is axially positioned at the lower center portion of the pulverizing chamber. Either a single or multiple nozzle may be used. The nozzle diameter is determined according to the size of the silicon feed particles. When pulverizing silicon feed particles within the diameter range of about 300–3,000 microns, the nozzle diameter is preferably in the range of about 1.0–2.5 min. The smaller the nozzle diameter, the less efficient is the pulverization of large particles. On the other hand, the amount of gas becomes excessive when the nozzle diameter exceeds the preferred range.

In the present invention, for one technique of forming a dilute-phase fluidized bed, the average gas velocity in the pulverizing chamber is maintained in a range of about 0.5–30 m/sec. Once the average gas velocity is set, particles with a lower terminal velocity than the average gas velocity are vented out of the pulverizing chamber and particles with a higher terminal velocity fall near the jet nozzle to be pulverized again in the jet stream. The average gas velocity is determined by the cross-sectional area of the pulverizing chamber (the inside diameter in the case of a cylindrical pulverizing chamber) when the gas flow rate in the pulverizing chamber is set.

Since the purpose of the present invention is to prepare silicon seed particles having an average diameter in the range of about 100–1,000 microns, it is preferable to maintain the average gas velocity lower than the terminal velocity of a silicon particle with a diameter of about 1 mm and higher than that of a silicon particle with a diameter of about 0.1 min. The average gas velocity is determined by the gas flow rate and the size of the pulverizing chamber, which is explained below with an example concerning spherical silicon particles.

A theoretically derived equation concerning the terminal velocity of a spherical particle is as follows:

$$Re = 20.52 \ [(1 + 0.0921 \ J^{0.5})^{0.5} - 1]^2$$

$$\text{wherein, } Re = \frac{dV_t \rho_g}{\mu_g}$$

$$\text{and } J = \frac{4(\rho_s - \rho_g)\rho_g d^3}{3\mu_g^2}$$

In the above equations, Re represents the Reynolds number; d represents the particle diameter; $V_t$ represents the terminal velocity of the particle; $\rho_s$ represents the solid density; $\rho_g$ represents the gas density; and $\mu_g$ represents the gas viscosity. This equation gives results which are within about 7% of experimental values for Re up to about 7,000 with an upper limiting diameter of about 7 mm. See page 614 of Handbook of Powder Science by Fayed and Otten (1984).

The above equation yields calculated terminal velocities of 6.61 m/sec and 0.53 m/sec, respectively, for silicon particles having a diameter of 1 mm and 0.1 mm in a stream of nitrogen gas, and 21.79 m/sec and 1.23 m/sec, respectively, in a stream of hydrogen gas. Although the actual terminal velocities of pulverized silicon particles are somewhat different from the calculated values because of non-spherical shape and because the gas flow rate may be regulated differently in accordance with the kind of gas used, the average gas velocity in the pulverizing chamber is required to be maintained preferably in a range of about 0.5–30 m/sec to produce seed particles having a diameter of about 100–1,000 microns.

The average gas velocity in the pulverizing chamber is determined by the cross-sectional area of the pulverizing chamber if the gas flow rate is set. For example, under the above-mentioned pulverizing conditions (nitrogen gas, nozzle diameter of 1.75 mm, and jet velocity of 1,640 m/sec), it is preferable to establish the diameter of the pulverizing chamber larger than $(1,640/6.61)^{0.5} = 15.8$ times that of the nozzle, i.e., about 27.7 mm in order to vent particles smaller than about 1 mm out of the pulverizing chamber. Additionally, it is preferable to establish the diameter of the pulverizing chamber smaller than $(1,640/0.53)^{0.5} = 55.3$ times that of the nozzle, i.e., about 97.3 mm to vent particles larger than about 0.1 mm.

Therefore, under the above jet pulverizing conditions, the diameter of the pulverizing chamber should be in a range of about 27.7–97.3 mm to produce silicon seed particles having a diameter of about 100–1,000 microns. The important advantage of the present invention is that the size of the seed particles may be controlled arbitrarily by adjusting the diameter of the pulverizing chamber. For example, as can be seen from the calculations under the above-mentioned jet pulverizing conditions, the size of produced silicon seed particles may be controlled by adjusting the diameter of the pulverizing chamber from about 27.7 to about 97.3 mm.

The average gas velocity in the pulverizing chamber is controlled by adjusting the gas flow rate for the jet stream and the cross-sectional area of the pulverizing chamber. Additionally, it may be controlled by introducing a supplementary gas into the lower part of the pulverizing chamber.

As described above, a method for adjusting the average gas velocity to form a dilute phase fluidized bed in the pulverizing chamber has been explained. According to experiments by the present inventors, although the average gas velocity is maintained in the above range, a slugging bed is finally formed which results in choking wherein silicon particles not pulverized are vented out of the pulverizing chamber intermittently when the particle density in the pulverizing chamber is greater than about 0.2. This results in the object of the present invention being thwarted. Therefore, in order to achieve the desired results of the present invention, the particle density between the jet nozzle outlet and the vent hole in the pulverizing chamber must be maintained below about 0.2, preferably in the range of about 0.01–0.1.

Since the collision frequencies between particles are reduced, thus decreasing the yield of silicon seed particles when the particle density in the pulverizing chamber is below about 0.01, it is important that the particle density be maintained in a predetermined range for maximizing the pulverizing efficiency under stable operating conditions.

According to the present invention, the feed rate of silicon feed particles is regulated properly following the pulverizing capacity to maintain the particle density in a predetermined range. When the feed rate is greater than the pulverizing capacity, the particle density in the pulverizing chamber increases gradually to result in choking, and when it is too small, the yield of pulverized particles is lowered. Therefore, it is necessary to regulate constantly the feed rate of silicon feed particles.

To feed silicon particles, a conventional feeder, e.g., a rotary feeder, screw feeder or vibration feeder, may be used. However, since it is very difficult to feed silicon particles without contamination using a conventional feeder, the present invention adopts a method of feeding by applying solids sealing principles. That is, an inlet hole is provided in a side wall at a level similar to the level of the jet nozzle, preferably within about 5 cm below the jet nozzle outlet, and the feeding line between the feed particle hopper and the inlet hole is substantially vertical. As pulverization continues, the number of silicon particles near the jet nozzle is gradually reduced to decrease the particle density near the inlet hole. Then, silicon feed particles are automatically introduced by gravity into the pulverizing chamber through the inlet hole to compensate for the decreased particle density.

The feed rate of silicon particles is determined by various factors, e.g., the feed particle size, the diameter of the inlet hole, the structure of the feeding line and the level of the inlet hole. According to the present invention, an additional gas line is provided at the feeding line just beside the inlet hole in order to regulate the feed rate regardless of these factors. The feed rate may be increased by flowing additional gas in a small amount through this gas line, and may be regulated arbitrarily by adjusting this gas flow rate in accordance with pulverizing conditions.

The silicon feed particles in the present invention have a diameter in a range of about 300–3,000 microns, preferably about 400–2,000 microns, and may be any shape, including spherical. The silicon seed particles that are used in a fluidized bed reactor for preparing polysilicon may be required to have a different size according to the operating condition of the fluidized bed reactor. The silicon seed particles should be smaller than the polysilicon products from the fluidized bed reactor, and have a diameter preferably in a range of about 100–1,000 microns.

The cross-sectional area of the vent hole should be smaller than that of the pulverizing chamber to form a stable dilute-phase fluidized bed. When the vent hole is narrower than the pulverizing chamber, pulverized silicon particles that are floated near the vent hole are easily vented out of the pulverizing chamber and the vented particles cannot be returned to the pulverizing chamber since the local gas velocity at the vent hole is faster than the average gas velocity in the pulverizing chamber. According to experiments by the present inventors, when the cross-sectional area of the vent hole was the same as or larger than that of the pulverizing chamber, the fluidization in the pulverizing chamber was very unstable so that the desired dilute-phase fluidized bed could not be formed. The area of the vent hole is normally less than one half of the cross-sectional area of the pulverizing chamber. For a pulverizing chamber with a diameter of 30–60 mm, a vent hole with a diameter of 10–15 mm is preferably positioned in the upper wall of the chamber.

Figure 2:
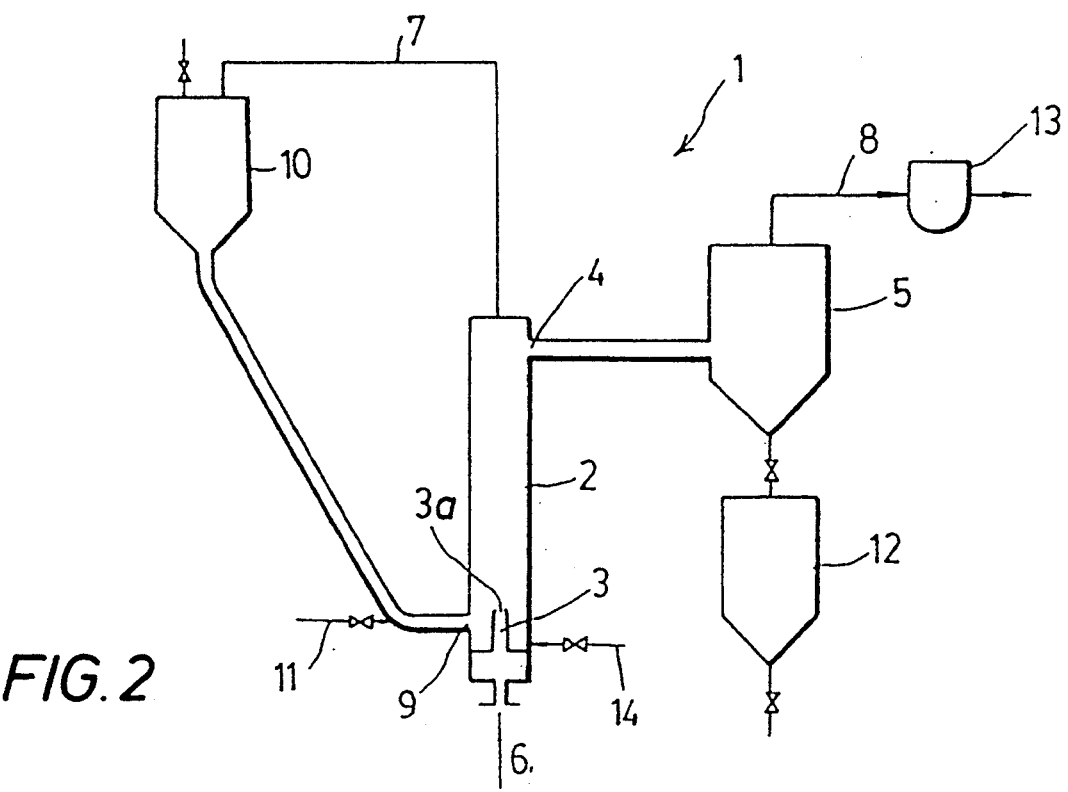
FIG. 2 illustrates another embodiment of the jet pulverizing apparatus which is used separately from a separation chamber according to the present invention.
Figure 3:
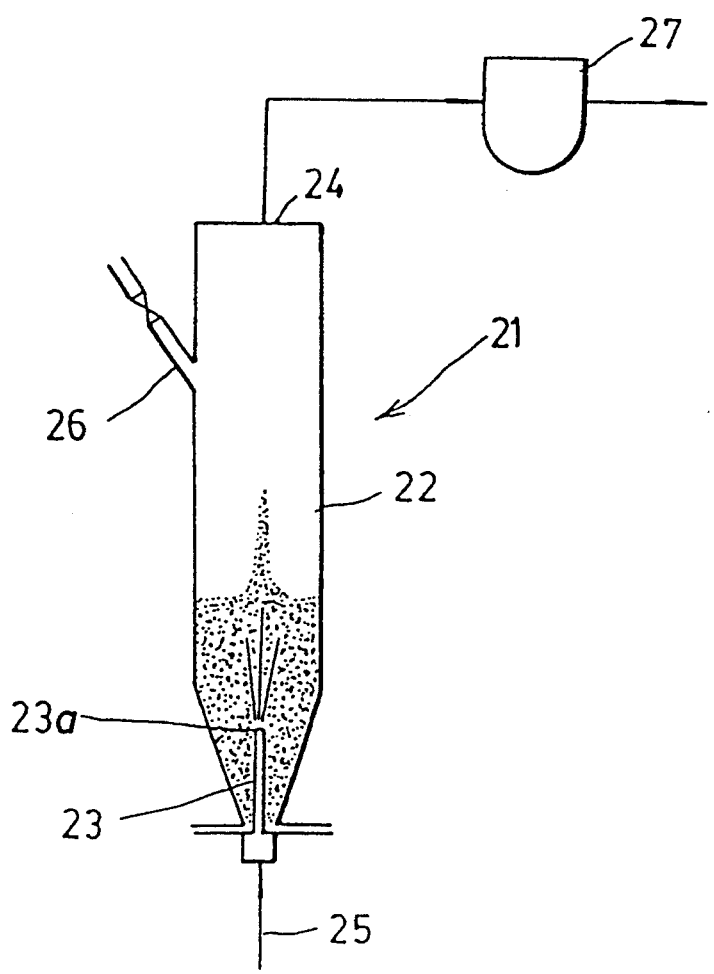
FIG. 3 illustrates a conventional fluidized-bed jet pulverizing apparatus.

A better understanding of the invention will be had by a review of the following description when read in conjunction with the drawings. FIG. 1 illustrates one embodiment of a jet pulverizing apparatus 1 that may be used in a united body with a separation chamber 5. FIG. 2 illustrates another embodiment of a jet pulverizing apparatus 1 that is used separately from a separation chamber 5. FIG. 3 illustrates a conventional fluidized-bed jet pulverizing apparatus 21.

The jet pulverizing apparatus 1 according to the present invention simply comprises cylindrical pulverizing chamber 2, jet nozzle 3 with a jet nozzle outlet 32 positioned at the lower center portion of pulverizing chamber 2, vent hole 4 positioned in the upper wall of pulverizing chamber 2, and inlet hole 9 positioned at the side wall of pulverizing chamber 2 at approximately the same level as jet nozzle 3.

Silicon feed particles of about 0.3–3 mm are charged into feed hopper 10, and are then introduced into pulverizing chamber 2 with a diameter of about 30–60 mm through inlet hole 9. A gas from gas inlet line 6 passes through jet nozzle 3 with a diameter of about 1.0–2.5 mm to generate a high-velocity jet stream. The average gas velocity in pulverizing chamber 2 may be regulated further by adjusting the gas flow from additional gas line 14. Silicon particles near jet nozzle 3 become entrained into the jet stream and accelerated to collide with each other to achieve the desired pulverizing action. Among the pulverized silicon particles, the smaller ones having terminal velocities less than the average gas velocity in pulverizing chamber 2 are floated upward by the gas stream. Thus, the small particles are vented out of chamber 2 through vent hole 4 with a diameter of about 10 mm. The vented silicon particles are then introduced into separation chamber 5 so that fine particles below about 100 microns may be removed through gas vent line 8 and taken by bag filter 13. The pulverized product particles in a desired size range are collected in seed hopper 12. These product particles are used as seed crystals for the silicon deposition in a fluidized bed reactor for preparing granular polysilicon. Particles with a higher terminal velocity than the average gas velocity in pulverizing chamber 2 fall down near jet nozzle 3 where they are pulverized again by the jet stream.

As pulverization continues, the number of silicon particles near jet nozzle 3 is gradually reduced and thus the particle density near inlet hole 9 is decreased. Then, feed particles are automatically introduced into pulverizing chamber 2 by gravity. The feed rate of silicon particles is determined by many factors such as the feed particle size, the geometry of the feeding line, the size and level of inlet hole 9, and the like. Additional gas line 11 is provided at the feeding line to regulate the feed rate regardless of these factors. The feed rate may be regulated by adjusting the gas flow rate through gas line 11 and, as a result, the particle density from jet nozzle outlet 32 to vent hole 4 in pulverizing chamber 2 may be controlled easily. Pressure equalizing line 7 is provided between feed hopper 10 and separation chamber 5 to maintain stability in the feeding system.

EXAMPLE 1

Silicon feed particles with an average diameter of about 1,275 microns as shown in Table 1 were pulverized in the jet pulverizing apparatus as shown in FIG. 1 under the following conditions. Feed particles were high purity polysilicon products from a fluidized bed reactor and having a nearly spherical shape. Jet pulverizing apparatus 1 comprises cylindrical pulverizing chamber 2 of 30 mm diameter and 70 cm height, jet nozzle 3 of 1.75 mm diameter provided at 2.5 cm above the bottom of pulverizing chamber 2, vent hole 4 of 1 cm diameter provided at 2.5 cm below the top of pulverizing chamber 2, inlet hole 9 provided at 1 cm below jet nozzle outlet 32, and separation chamber 5 of diameter 11 cm. About 250 liter/min. of nitrogen gas was supplied through jet nozzle 3 to pulverize silicon particles. In this case the calculated jet velocity at jet nozzle outlet 32 and the calculated average gas velocity in pulverizing chamber 2 are 1,730 m/sec and 5.9 m/sec, respectively. Feed particles were introduced into pulverizing chamber 2 with a rate of about 6.6 gm/min. by regulating the nitrogen gas flow through gas line 11. After pulverizing for about 30 minutes, pulverized silicon particles collected in seed hopper 12 were sieved to show a size distribution with an average diameter (geometric mean) of about 614 microns as shown in Table 1. Most of the feed particles were observed to be pulverized into two or more pieces. The quantity of fine particles (below about 100 microns) vented out of separation chamber 5 was about 2% of the feed of silicon particles.

TABLE 1

Size distribution of silicon feed particles and pulverized silicon particles in Example 1.

| particle diameter range (microns) | silicon feed particles (wt. %) | pulverized silicon particles (wt. %) |
| --- | --- | --- |
| 1,680–1,410 | 49.5 | 0.3 |
| 1,410–1,000 | 37.8 | 5.8 |
| 1,000–710 | 12.4 | 50.1 |
| 710–590 | 0.2 | 16.8 |
| 590–500 | 0.1 | 8.1 |
| 500–420 | — | 6.3 |
| 420–350 | — | 4.7 |
| 350–250 | — | 5.2 |
| 250–100 | — | 2.7 |
| average diameter (microns) | 1,275 | 614 |

EXAMPLE 2

In the same jet pulverizing apparatus as in Example 1, silicon feed particles of 1,000–1,410 microns (average diameter=1,205 microns) having a nearly spherical shape were pulverized. About 200 liter/min of nitrogen gas was supplied through jet nozzle 3 to pulverize the silicon particles. The calculated jet velocity at the jet nozzle outlet 32 and the calculated average gas velocity in pulverizing chamber 2 are 1,385 m/sec and 4.7 m/see, respectively. After pulverizing for about 1 hour by introducing feed particles with a feed rate of about 5.2 gm/min into pulverizing chamber 2, pulverized particles collected in seed hopper 12 were sieved. The results are shown in Table 2 wherein the size distribution is shown and the average diameter (geometric mean) is about 445 microns. The quantity of fine particles (below about 100 microns) vented out of separation chamber 5 was about 5% of the feed of silicon particles.

COMPARATIVE EXAMPLE 1

The same silicon feed particles as in Example 2 having an average diameter of 1,205 microns were charged and pulverized in a conventional fluidized-bed jet pulverizing apparatus 21 as shown in FIG. 3. Pulverizing chamber 22 is cylindrical with a diameter of 11 cm and is provided with jet nozzle 23 for gas inlet line 25 at the lower center thereof. Before a pulverizing run, pulverizing chamber 22 was filled with 1,700 gm of feed particles through feeding hole 26 so that the packed bed of silicon particles has 14 cm height above jet nozzle outlet 232. As in Example 2 about 200 liter/min of nitrogen was supplied through jet nozzle 23 to pulverize the silicon particles. In this case the calculated average gas velocity in the pulverizing chamber is 0.35 m/sec. After pulverizing for 2 hours, all the silicon particles in the pulverizing chamber were discharged, weighed and sieved. The total quantity of recovered silicon particles was about 1,670 gm, among which the pulverized particles below 1,000 microns were 207 gm and had a size distribution with an average diameter (geometric mean) of 637 microns as shown in Table 2. The quantity of fine particles (below about 100 microns) vented out of pulverizing chamber 22 through vent hole 24 to bag filter 27 was about 30 gm which corresponds to 14.5% of the pulverized particles.

TABLE 2

Experimental results for comparing the jet pulverizing method of the present invention with the conventional fluidized-bed jet pulverizing method.

| particle diameter range (microns) | pulverized silicon particles in Example 2 (wt. %) | pulverized silicon particles in Comparative Example 1 (wt. %) |
| --- | --- | --- |
| 1,410–1,000 | 0.3 | — |
| 1,000–840 | 14.2 | 66.3 |
| 840–710 | 28.6 | 18.3 |
| 710–590 | 19.0 | 3.5 |
| 590–420 | 14.1 | 1.5 |
| 420–297 | 7.0 | 1.8 |
| 297–210 | 5.2 | 3.0 |
| 210–100 | 11.6 | 5.6 |
| average diameter (microns) | 445 | 637 |
| yield (gm/min) | 5.2 | 4.5 |
| fine particles vented out of the system (wt. %) | ≈5.0 | ≈14.5 |

Example 2 and Comparative Example 1 show that the conventional jet pulverizing method is far less efficient and generates more fine silicon particles which are not suitable for use as seed crystals than the jet pulverizing method of the present invention.

As explained above, in producing silicon seed particles by pulverizing silicon particles, the jet pulverizing method of the present invention has a higher efficiency and simplicity than the conventional methods, and also has the important following merits.

First, in contrast to the conventional methods wherein a high-purity silicon bar or colliding plate must be replaced periodically with a new one because of severe abrasion, the abrasion of the chamber wall and the jet nozzle in the present invention is insignificant since most pulverization occurs by self-collisions between silicon particles. Secondly, in contrast to the conventional methods wherein the yield of product seed particles in the required size range is low since pulverization occurs by one compression or collision, the yield in the present invention is high since particles greater than a predetermined size are pulverized again repeatedly in the pulverizing chamber until being pulverized sufficiently. Thirdly, in contrast to the conventional methods wherein the sieving system is complicated since particles greater than a predetermined size must be separated by an additional sieving apparatus, additional sieving to separate larger particles is not required in the present invention since the size distribution of seed particles can be arbitrarily controlled by regulating the average gas velocity in the pulverizing chamber. Fourthly, in contrast to the conventional fluidized bed jet pulverizing method, not as many fine particles which are not suitable for use as seed crystals are generated since pulverized particles in a required size range are immediately vented out of the pulverizing chamber in the method of present invention. Lastly, silicon seed particles with a high purity may be easily produced since non-contaminating materials such as high purity silicon and quartz may be used to fabricate the jet pulverizing apparatus according to the present invention because of the simple structure.

What is claimed is:

1. In generating silicon seed particles of about 100–1,000 microns by pulverizing silicon feed particles of about 300–3,000 microns, a method which comprises the steps of:
   providing a single pulverizing chamber having a lower section and an upper section both disposed along an axial direction of said chamber with a jet nozzle disposed in said lower section;
   introducing said silicon feed particles into said pulverizing chamber through an inlet hole positioned at the wall of said pulverizing chamber:
   providing a jet stream in said axial direction of said pulverizing chamber with a jet velocity of about 300–10,000 m/sec at a jet nozzle outlet by introducing a stream of gas through said jet nozzle, and thereby accelerating silicon particles near said jet nozzle into collision with each other and pulverization thereof so that said seed particles are generated;
   allowing said jet stream to expand into said upper section of said pulverizing chamber so that the expanded gas flows axially upward through said chamber;
   maintaining the average gas velocity in said upper section of said chamber in a range of about 0.5–30 m/sec so that relatively small silicon particles below a predetermined size are caused to rise up within said upper section;
   maintaining the particle density below about 0.2 between said jet nozzle outlet and a vent hole in the wall of said upper section, and thereby providing a dilute-phase fluidized bed without an upper boundary above said jet nozzle such that relatively large particles over said predetermined size in said upper section fall by gravity and re-pulverize in said jet stream; and
   providing the cross-sectional area of said vent hole substantially smaller than that of said upper section of said pulverizing chamber so that said small silicon particles in said upper section are effectively removed out of said pulverizing chamber through said vent hole.

2. The method of claim 1 further comprising positioning said inlet hole at substantially the same level as the position of said jet nozzle outlet.

3. The method of claim 1 further comprising positioning said inlet hole at a lower level than the position of said jet nozzle outlet.

4. The method of claim 1 further comprising providing a substantially vertical feeding line between a feed hopper and said inlet hole to permit gravity feed.

5. The method of claim 4 further comprising providing an additional gas line at said feeding line near said inlet hole to thereby regulate the feed rate of said silicon feed particles by adjusting the gas flow through said additional gas line.

6. The method of claim 1 wherein said pulverizing chamber is provided with a plurality of jet nozzles.

7. The method of claim 1 wherein said silicon feed particles have a diameter in the range of about 400–2000 microns.

8. The method of claim 1 wherein said pulverizing chamber and said jet nozzle are comprised of or lined with high purity silicon.

9. The method of claim 1 further comprising regulating the average gas velocity in said pulverizing chamber by flowing an additional gas into said lower section of said pulverizing chamber.

10. The method of claim 1 wherein said particle density is maintained between about 0.01 and about 0.1.

11. The method of claim 1 wherein said particle density is maintained below about 0.2 by regulating the feed rate of said silicon feed particles.

12. A method for generating silicon seed particles having a particle diameter within a desired range, comprising:
   providing a single pulverizing chamber having a lower section and an upper section both disposed along an axial direction of said chamber with a jet nozzle disposed in said lower section;
   introducing silicon feed particles with a diameter within a preselected range into said pulverizing chamber through an inlet hole positioned in the wall of said chamber;
   providing a jet stream int he axial direction of said pulverizing chamber at a jet nozzle outlet by introducing a gas stream through said jet nozzle;
   allowing said jet stream to expand into said upper section of said pulverizing chamber so that the expanded gas flows axially upward through said chamber;
   maintaining the particle density in said pulverizing chamber below a predetermined level between said jet nozzle outlet and a vent hole positioned in the wall of said upper section, so that silicon particles in said pulverizing chamber form a dilute-phase fluidized bed without an upper boundary above said jet nozzle; and
   maintaining the average gas velocity in said upper section of said chamber so that pulverized silicon particles having a diameter up to the upper limit of said desired range are floated by uprising gas flow and removed out of said pulverizing chamber through said vent hole having an area smaller than the cross-sectional area of said pulverizing chamber.

13. The method of claim 12 wherein said average gas velocity in said upper section of said pulverizing chamber is maintained between about 0.5–30 m/sec.

14. The method of claim 12 wherein said particle density is maintained below about 0.2.

15. The method of claim 12 wherein the jet velocity of the gas at said jet nozzle outlet is maintained between about 300–10,000 m/sec.

16. The method of claim 12 wherein said particle density is maintained in the range of about 0.01–0.1.

17. The method of claim 16 wherein the jet velocity of the gas at said jet nozzle outlet is maintained between about 1000–5000 m/sec.

18. The method of claim 12 wherein the cross-sectional area of said upper section of said pulverizing chamber is at least twice the area of said vent hole.

19. The method of claim 12 further comprising axially positioning said jet nozzle outlet within the lower section of said pulverizing chamber, introducing said silicon feed particles through a wall of said chamber at a level substantially similar to or lower than said jet nozzle outlet.

20. The method of claim 12 wherein said gas stream comprises a gas selected from the group consisting of air, nitrogen, carbon dioxide, hydrogen, helium, and argon.

* * * * *